(12) United States Patent
Marshall et al.

(10) Patent No.: US 11,524,776 B2
(45) Date of Patent: Dec. 13, 2022

(54) ROTOR CONTROL MECHANISM

(71) Applicant: AVX Aircraft Company, Benbrook, TX (US)

(72) Inventors: Bryan Marshall, Mansfield, TX (US); James Harris, Dalworthington Gardens, TX (US); Jason McPeak, Weatherford, TX (US); Steve Lewis, Alvarado, TX (US)

(73) Assignee: AVX Aircraft Company, Benbrook, TX (US)

( * ) Notice: Subject to any disclaimer, the term of this patent is extended or adjusted under 35 U.S.C. 154(b) by 19 days.

(21) Appl. No.: 16/888,519

(22) Filed: May 29, 2020

(65) Prior Publication Data

US 2020/0377208 A1 Dec. 3, 2020

Related U.S. Application Data

(60) Provisional application No. 62/854,443, filed on May 30, 2019.

(51) Int. Cl.
*B64C 27/605* (2006.01)
*F01D 7/00* (2006.01)
*F01D 25/16* (2006.01)
*B64C 27/10* (2006.01)

(52) U.S. Cl.
CPC ............ *B64C 27/605* (2013.01); *B64C 27/10* (2013.01); *F01D 7/00* (2013.01); *F01D 25/16* (2013.01); *F05D 2220/90* (2013.01); *F05D 2240/20* (2013.01); *F05D 2240/50* (2013.01)

(58) Field of Classification Search
CPC ......... B64C 27/605; B64C 27/10; F01D 7/00; F01D 25/16; F05D 2240/20; F05D 2240/50; F05D 2220/90
See application file for complete search history.

(56) References Cited

U.S. PATENT DOCUMENTS

| 6,231,005 B1 * | 5/2001 | Costes .................. B64C 27/605 244/17.25 |
| 9,038,940 B1 * | 5/2015 | van der Westhuizen .................... B64C 27/18 244/17.25 |
| 9,764,832 B2 * | 9/2017 | Hoyle ................... B64C 27/605 |
| 2014/0133980 A1 * | 5/2014 | Stamps ................. B64C 27/605 416/1 |
| 2015/0321754 A1 * | 11/2015 | Uebori .................... B64C 27/10 244/17.23 |
| 2015/0321756 A1 * | 11/2015 | Uebori ................... B64C 27/78 416/99 |
| 2019/0127058 A1 * | 5/2019 | Antoine ................ B64C 27/605 |

FOREIGN PATENT DOCUMENTS

RU 2307766 C1 * 10/2007
RU 2641552 C1 * 1/2018

* cited by examiner

*Primary Examiner* — Christopher Verdier
*Assistant Examiner* — Jesse M Prager
(74) *Attorney, Agent, or Firm* — Greenberg Traurig, LLP

(57) ABSTRACT

A compact and unobtrusive rotor control mechanism is presented that provides collective and cyclic pitch change to both rotors of a coaxial rotor system as well as a differential collective pitch change to one or both rotors simultaneously.

9 Claims, 5 Drawing Sheets

ROTOR CONTROL MECHANISM

BACKGROUND

The present application is a non-provisional of U.S. Provisional Patent Application Ser. No. 62/854,443, titled "Rotor Control Mechanism", filed May 30, 2019, which is incorporated herein as if set out in full.

Traditional single rotor helicopters use simple, 3-input "swashplates," such as the one depicted in FIG. 1. These 3-input swashplates transmit inputs from the pilot to the rotor system in the form of collective pitch change (all blades being affected equally) and cyclic pitch change (each blade being affected uniquely in proportion to the tilt angle and azimuth of the swashplate). Helicopters with coaxial rotors (in which two rotors are mounted coaxially and spaced apart from one another, and which rotate in opposite directions via concentric shafts that rotate in opposite directions, as understood in the art) employ a separate system of one type or another to impart a "differential collective" pitch change which affects the upper and lower rotors differently. These devices are typically heavy and cumbersome, such as the one depicted in FIG. 2. This adds unwanted weight, drag, and overall air vehicle height. What is needed is a multi-input compound swashplate assembly that is compact and unobtrusive.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The present disclosure provides a rotor control system for a rotor aircraft. In various embodiments, the system is provided as a compound swashplate assembly, including a first swashplate assembly and a second swashplate assembly. The first and second swashplate assemblies each include a non-rotating ring and a rotating ring coupled to one another by rotation bearings that allow the rotating ring to rotate with a transmission mast. In some embodiments, the non-rotating rings and rotating rings of the swash plate assemblies are joined to one another by a sliding journal, which allows the non-rotating ring and rotating ring to rise and fall perpendicular to the rotation bearings while remaining parallel to each other, without relative rotation.

In particular embodiments, the first rotating ring and second rotating ring each rise and fall along with their respective first non-rotating ring and second non-rotating ring. The first rotating ring and second rotating ring may be coupled with one another to permit differential rise and fall of the first rotating ring and second rotating ring, in a manner that provides independent control of the upper and lower rotor collective pitch.

In various embodiments, an output of the first rotating ring is transmitted via linkages directly to pitch horns of a lower rotor. In such embodiments, an output of the second rotating ring may be transmitted via linkages to an upper swashplate assembly, whereby the upper swashplate reverses the direction of rotation to match an upper rotor (via a connection between the upper swashplate and the mast supporting the upper rotor). An output of the upper swashplate may also be transmitted via linkages directly to pitch horns of the upper rotor.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
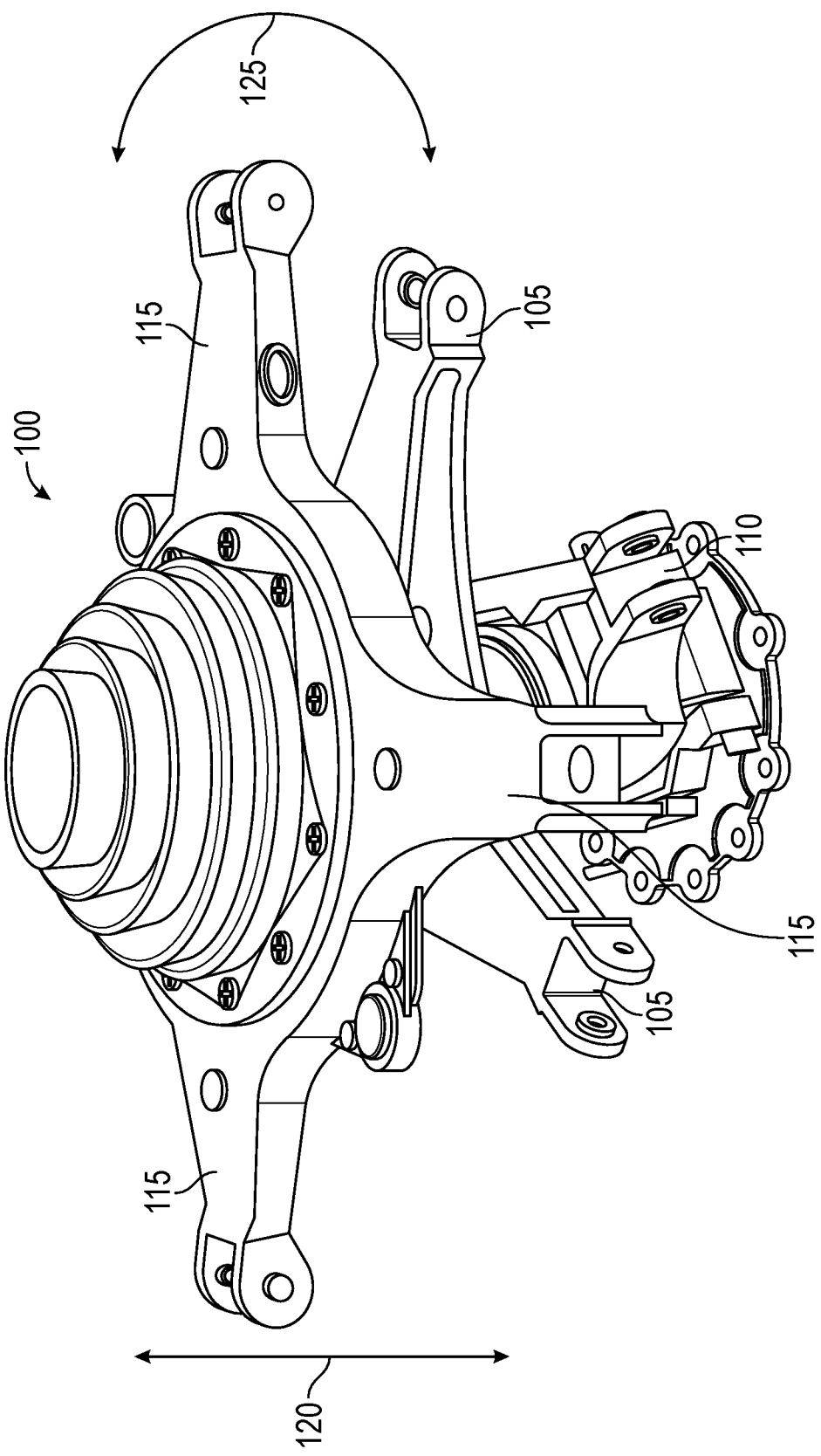
FIG. 1 depicts a perspective view of a prior art, 3-input swashplate assembly.

FIG. 1 depicts a perspective view of a prior art, 3-input swashplate assembly 100. The prior art swashplate assembly 100 includes cyclic inputs 105, collective input 110, and outputs 115 to individual blades of the rotor. Collective action is driven by motion of the collective input 110 generally along pathway 120. Cyclic action is driven by motion of the cyclic inputs 105 as a tilting motion generally illustrated as pathway 125 (or other tilting pathways).

Figure 2:
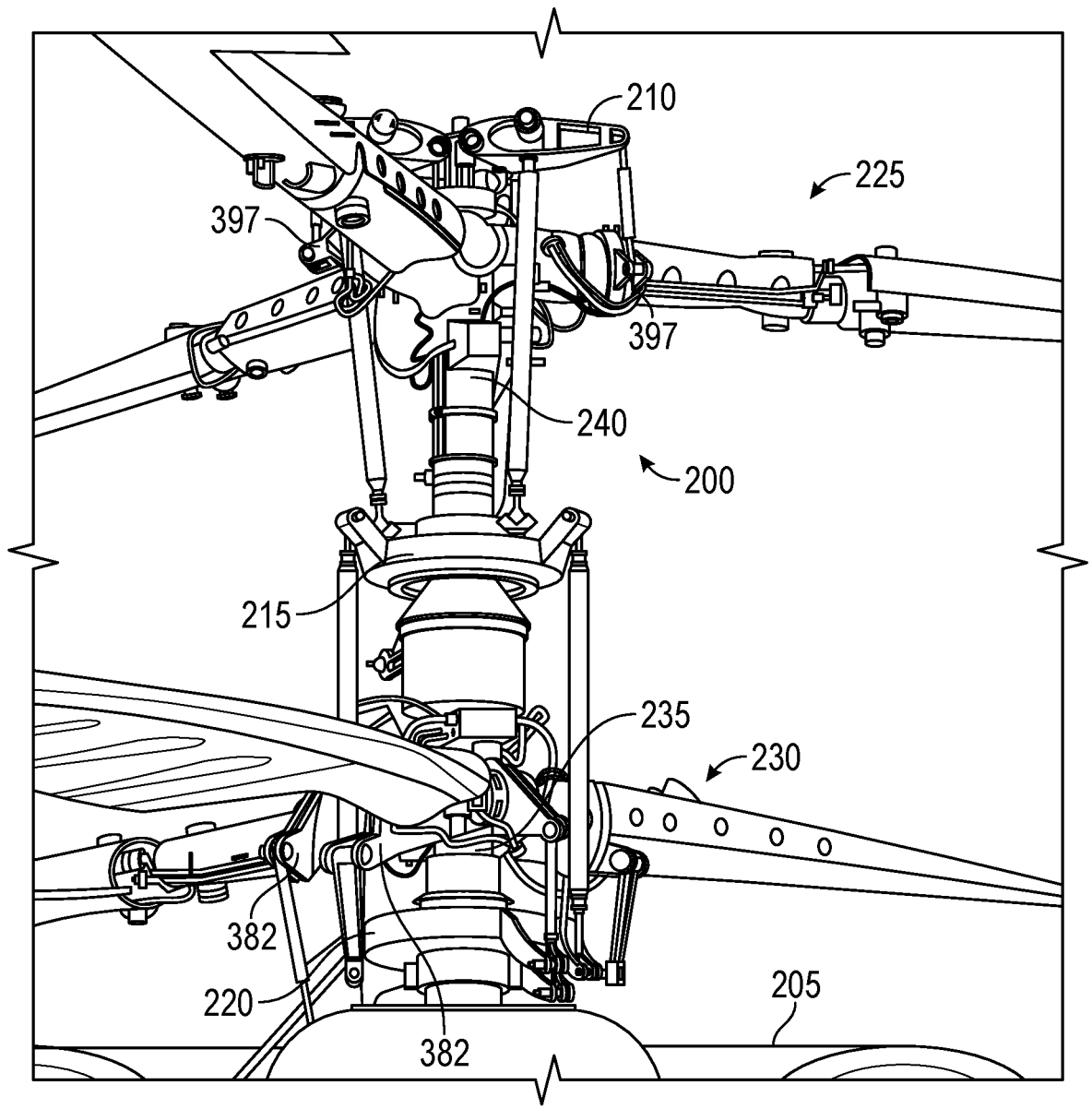
FIG. 2 depicts an isometric view of a prior art rotor control assembly on a coaxial rotor helicopter that incorporates the use of a differential collective lever, an upper swashplate, and a lower swashplate.

FIG. 2 depicts an isometric view of a prior art rotor control assembly 200 on a coaxial rotor helicopter 205 that incorporates the use of a differential collective lever 210, an upper swashplate 215, and a lower swashplate 220. An upper rotor 225 is mounted coaxially with a lower rotor 230. As is known in the art, the upper rotor 225 rotates in an opposite direction from the direction of rotation of the lower rotor 230 (they are counter-rotating). This is accomplished by mounting each rotor 225, 230 on its own mast or shaft. For example, the lower rotor 230 is mounted on a first shaft 235 (shown schematically) and the upper rotor 225 is mounted on a second shaft 240 (shown schematically). The first shaft 235 and the second shaft 240 are concentric and counter-rotating. The prior art rotor control assembly 200 employs a separate system of one type or another to impart a "differential collective" pitch change which affects the upper rotor 225 and the lower rotor 230 differently.

With reference to FIGS. 3, 4A, 4B, 5A, and 5B, embodiments of the present technology include a novel rotor control for rotor aircraft. Embodiments of the present technology include a compound swashplate assembly 300. The compound swashplate assembly 300 incorporates the use of, a first swashplate assembly 305 and a second swashplate assembly 310, contained within a single compound swashplate assembly 300. The first swashplate assembly 305 includes a first non-rotating ring 315 and a first rotating ring 320 joined to one another by rotation bearings 325 (shown in FIGS. 3 and 5B) that allow the first rotating ring 320 to rotate with an outer transmission mast 330 of the aircraft (the inner transmission mast is not shown but is understood in the art; the inner transmission mast is concentrically positioned within the outer transmission mast 330 and counter-rotates relative to the outer transmission mast 330 so that the upper and lower rotors counter-rotate; the lower rotor is not shown but is attached to a lower rotor attachment area 335, which is understood in the art; the upper rotor and upper rotor attachment area are not shown, but are understood in the art). In various embodiments, the second swashplate assembly 310 includes structure that is similar to the first swashplate assembly 305, having a second non-rotating ring 340 and a second rotating ring 345 joined to one another by rotation bearings 350 (shown in FIGS. 3 and 5A) that allow the second rotating ring 345 to rotate with the outer transmission mast 330.

In various embodiments of the present technology, the first non-rotating ring 315 and the first rotating ring 320 of the first swashplate assembly 305 are joined to one another by a sliding journal (not shown), which may include one or more of a first sliding spline, partial spline, keyway, or guide rod(s) to allow the first non-rotating ring 315 and first rotating ring 320 to rise and fall perpendicular to the aforementioned rotation bearings 325 while remaining parallel to each other and without relative rotation. In such embodiments, at least part of the second swashplate assembly 310 may be configured similarly to the first swashplate assembly 305. For example, the second non-rotating ring 340 and the second rotating ring 345 may be joined to one another by a sliding journal (not shown) that may include one or more of a second sliding spline, partial spline, keyway, or guide rod(s) to allow the second non-rotating ring 340 and the second rotating ring 345 to rise and fall perpendicular to the rotation bearings 350 while remaining parallel to each other, without relative rotation.

Figure 4B:
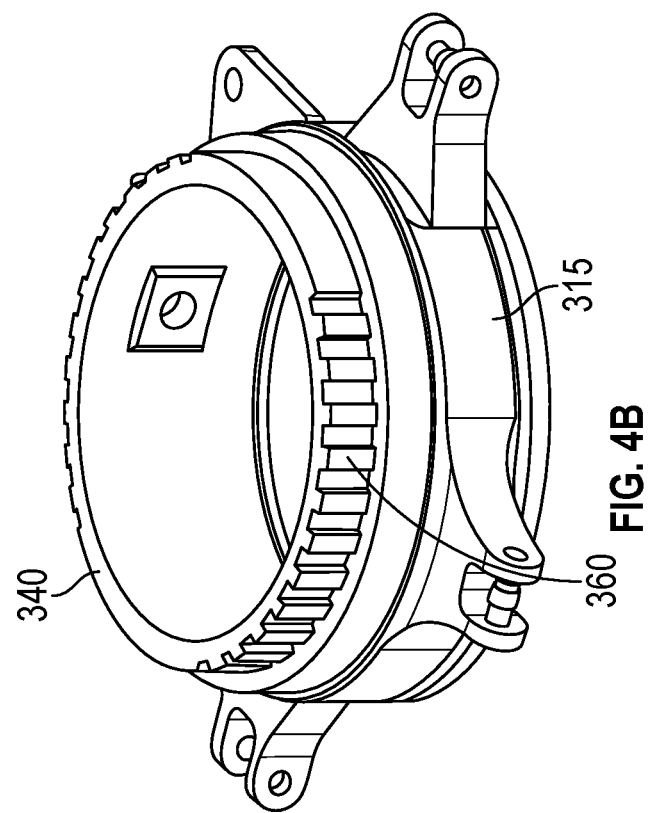
FIGS. 4A and 4B depict isometric views of embodiments of non-rotating rings that can be used with the compound swashplate assembly of the present technology.
Figure 4A:
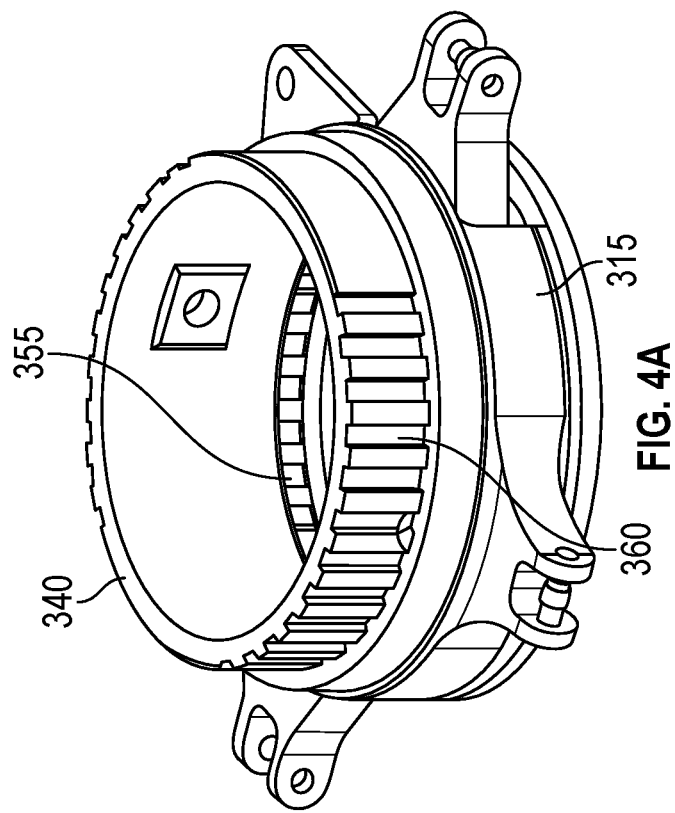
Figure 5B:
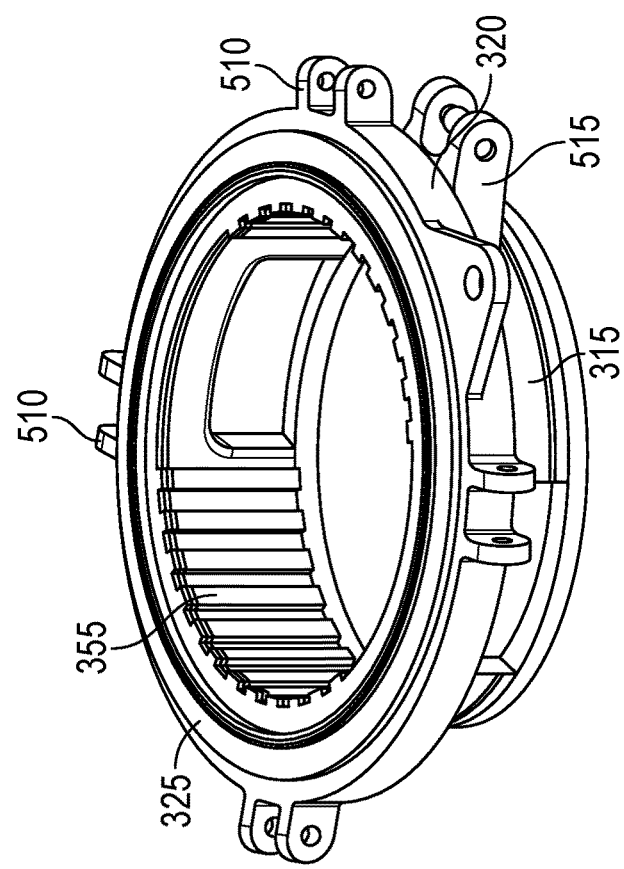
FIGS. 5A and 5B depict isometric views of embodiments of individual swashplate assemblies that can be used with the compound swashplate assembly of the present technology.
Figure 5A:
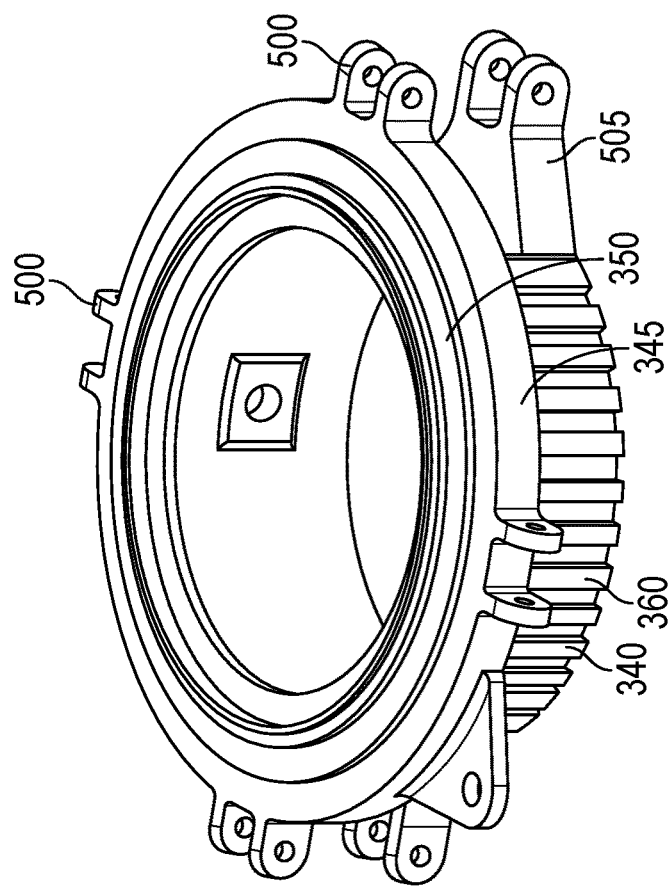

FIGS. 4A and 4B also show sliding movement of the second non-rotating ring 340 relative to the first non-rotating ring 315 via corresponding sliding splines 355, 360 (the splines 355, 360 are also visible in FIGS. 5A and 5B). Specifically, FIG. 4A shows a first position and FIG. 4B shows a second position.

Figure 3:
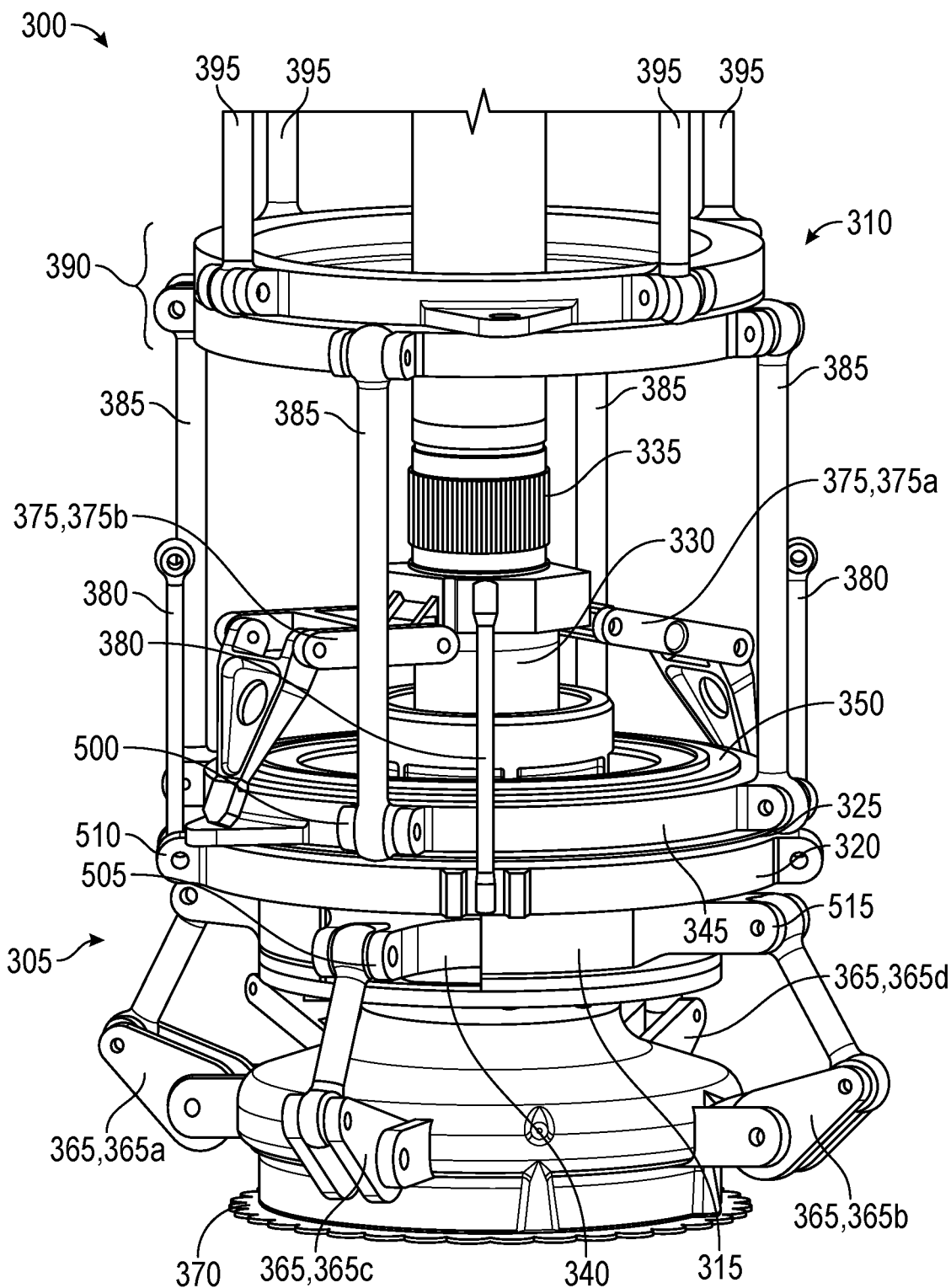
FIG. 3 depicts a partial, elevation view of one embodiment of a compound swashplate assembly of the present technology.

With reference to the embodiment depicted in FIG. 3, four actuation devices 365 (e.g., actuation devices 365a, 365b, 365c, 365d) are grounded to an airframe/other non-rotating structure 370 of the aircraft. The actuation devices 365 are coupled to the first non-rotating ring 315 and the second non-rotating ring 340 of the compound swash plate assembly 300. In at least one embodiment, two of the actuation devices 365 (e.g., 365a, 365b), arranged approximately 180° apart from one another, are attached to the first non-rotating ring 315 and the other two actuation devices 365 (e.g., 365c, 365d), approximately 180° apart from one another and approximately 90° apart from the first two actuation devices 365 (e.g., 365a, 365b), are attached to the second non-rotating ring 340. In an alternate embodiment three actuation devices 365, approximately equally spaced around the azimuth attached to the first non-rotating ring 315 and a fourth actuation device 365 attached to the second non-rotating ring 340 and grounded to either the airframe/other non-rotating structure 370 of the aircraft or the other non-rotating ring (e.g., the first non-rotating ring 315). With reference to FIGS. 3, 4A, and 4B, the sliding movement between the first non-rotating ring 315 and the second non-rotating ring 340 is generated by the actuation devices 365.

As further depicted in the exemplary embodiment, the first rotating ring 320 and the second rotating ring 345 of the compound swash plate assembly 300 each rise and fall along with their respective first non-rotating ring 315 or second non-rotating ring 340. Each is driven by its own drive link/lever arrangement 375 (also called "drivers", e.g., 375a, 375b) that is coupled with the outer transmission mast 330 so they are always in synch with each other around the azimuth. It is this differential rise and fall of the first rotating ring 320 and the second rotating ring 345 that allows independent control of the upper and lower rotor collective pitch.

In various embodiments of the present technology, as depicted in FIG. 3, the output of the first rotating ring 320 is transmitted via linkages 380 directly to pitch horns of a lower rotor (pitch horns are not shown in FIG. 3, but are understood within the art of rotorcraft design, for example see pitch horns 382 in FIG. 2). The output of the second rotating ring 345 is transmitted via linkages 385 to an upper swashplate assembly 390 (the upper swashplate assembly 390 can be considered part of the second swashplate assembly 310 by way of connection between the upper swashplate assembly 390 and the second rotating ring 345, via the linkages 385). The upper swashplate assembly 390 reverses the direction of rotation to match the upper rotor (by a connection between a rotating portion of the upper swashplate assembly 390 and the inner transmission mast). The output of the upper swashplate assembly 390 is transmitted via linkages 395 directly to the pitch horns of the upper rotor (pitch horns are not shown in FIG. 3, but are understood within the art of rotorcraft design, for example see pitch horns 397 in FIG. 2).

FIG. 5A illustrates upper swashplate connecting rod attachment devises 500 for connecting the linkages 385 to the second rotating ring 345 (see also FIG. 3). FIG. 5A also shows an actuation attachment clevis 505 for connecting an actuation device 365 to the second non-rotating ring 340 (see also FIG. 3). FIG. 5B illustrates pitch link attachment devises 510 for connecting the first rotating ring 320 to the linkages 380 (see also FIG. 3). FIG. 5B also illustrates an actuation attachment clevis 515 for connecting an actuation device 365 to the first non-rotating ring 315 (see also FIG. 3).

Embodiments of the present technology do not require secondary system of links, levers, actuators, etc. to change differential collective pitch.

Although the technology been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. An aircraft system comprising a rotor control system, the rotor control system comprising:
a first swashplate assembly including a first non-rotating ring and a first rotating ring coupled to the first non-rotating ring by first rotation bearings; the first non-rotating ring having at least one opening formed in a side portion of the first non-rotating ring; and
a second swashplate assembly including a second non-rotating ring and a second rotating ring coupled to the second non-rotating ring by second rotation bearings; the second non-rotating ring having at least one attachment clevis extending radially from a side portion of the second non-rotating ring;
wherein the second non-rotating ring is concentric with the first non-rotating ring and the second non-rotating ring is positioned to slide within the first non-rotating ring and the at least one attachment clevis, extending through the at least one opening of the first non-rotating ring, is shaped to move vertically within the at least one opening when the second non-rotating ring slides within the first non-rotating ring.

2. The aircraft system of claim 1, wherein:
the second non-rotating ring is slidable within the first non-rotating ring via splines.

3. The aircraft system of claim 1, further comprising:
a plurality of actuators positioned to couple a non-rotating structure of an aircraft with at least one attachment clevis of the first non-rotating ring and the at least one attachment clevis of the second non-rotating ring.

4. The aircraft system of claim 3, wherein:
a first pair of the actuators are arranged 180 degrees apart from one another and are attached to a pair of attachment devises of the first non-rotating ring; and
a second pair of the actuators, 180 degrees apart from one another and approximately 90 degrees apart from the first pair of actuators, are attached to a pair of attachment devises of the second non-rotating ring.

5. The aircraft system of claim 3, wherein:
three of the plurality of actuators are approximately equally spaced around an azimuth attached to the first non-rotating ring and a fourth actuator is attached to an attachment clevis of the second non-rotating ring and grounded to the non-rotating structure of the aircraft.

6. The aircraft system of claim 1, wherein the rotor control system comprises drive links positioned to couple the first rotating ring and the second rotating ring to a transmission mast.

7. The aircraft system of claim 1, comprising an aircraft having an upper rotor and a lower rotor that counter-rotate relative to each other, wherein:
the lower rotor comprises one or more first pitch horns;
the rotor control system comprises one or more first linkages; and
an output of the first rotating ring is transmitted via the one or more first linkages directly to the first pitch horns of the lower rotor.

8. The aircraft system of claim 7, wherein:
the rotor control system comprises an upper swashplate assembly and one or more second linkages; and
an output of the second rotating ring is transmitted via the one or more second linkages to the upper swashplate assembly, wherein a portion of the upper swashplate assembly is rotatable in a direction that matches a direction of rotation of the upper rotor.

9. The aircraft system of claim 8, wherein:
the upper rotor comprises one or more second pitch horns;
the rotor control system comprises one or more third linkages; and
an output of the upper swashplate assembly is transmitted via the one or more third linkages directly to the one or more second pitch horns of the upper rotor.

* * * * *